United States Patent
Stanley et al.

(10) Patent No.: US 7,032,929 B2
(45) Date of Patent: Apr. 25, 2006

(54) SEAT BELT DEVICE

(75) Inventors: James G. Stanley, Novi, MI (US); Hiroki Takehara, Auburn Hills, MI (US)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 10/712,262

(22) Filed: Nov. 14, 2003

(65) Prior Publication Data

US 2005/0062277 A1   Mar. 24, 2005

Related U.S. Application Data

(62) Division of application No. 10/604,319, filed on Jul. 10, 2003.

(60) Provisional application No. 60/394,815, filed on Jul. 10, 2002.

(51) Int. Cl.
*B60R 22/46* (2006.01)

(52) U.S. Cl. ................. 280/801.1; 73/862.393
(58) Field of Classification Search ............ 280/801.1, 280/806, 808; 297/468, 483; 73/862.451, 73/862.453, 862.391, 862.396, 862.541, 73/862.53, 862.393
See application file for complete search history.

(56) References Cited

U.S. PATENT DOCUMENTS

| | | | | |
|---|---|---|---|---|
| 3,891,272 A | * | 6/1975 | Takada | 297/472 |
| 4,103,933 A | * | 8/1978 | Fisher et al. | 297/468 |
| 4,371,193 A | * | 2/1983 | Takada | 280/806 |
| 5,860,706 A | * | 1/1999 | Fausel | 297/481 |
| 5,996,421 A | * | 12/1999 | Husby | 73/862.451 |
| 6,301,977 B1 | * | 10/2001 | Stojanovski | 73/862.393 |
| 6,336,371 B1 | * | 1/2002 | O'Boyle | 73/865.9 |
| 6,729,428 B1 | * | 5/2004 | Jitsui | 180/268 |

* cited by examiner

Primary Examiner—David R. Dunn
(74) *Attorney, Agent, or Firm*—Foley & Lardner LLP

(57) ABSTRACT

A webbing of a seat belt engages an opening of a seat belt tension sensor. In one embodiment, the webbing is bunched or folded so as to prevent rubbing against the sides of the opening in the housing and anchor plate, or an outer surface of the seat belt tension sensor. The webbing is maintained in a bunched or folded state using either a set of stitches between the two portions of the webbing of the loop; separate sets of stitches in the respective separate portions; a ring enclosing the two portions; separate rings, or ring portions separated by a spacer, enclosing the respective separate portions; or a sleeve, thimble, or thimble portion of the carriage of the seat belt tension sensor engaging the bunched or folded webbing. In another embodiment, the openings in the housing and anchor plate are sufficiently wider than the opening in the carriage, and the carriage incorporates a flange.

13 Claims, 7 Drawing Sheets

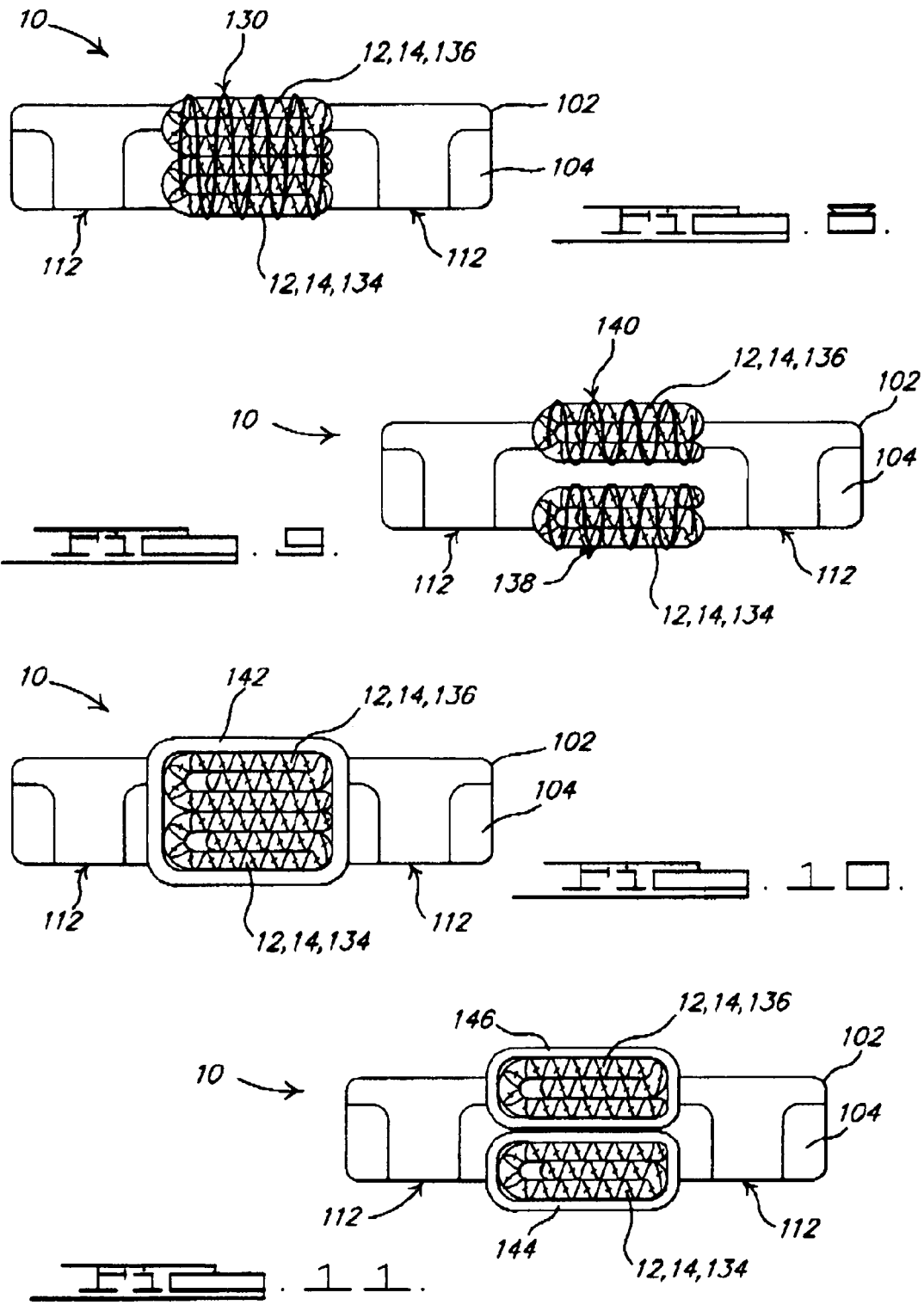

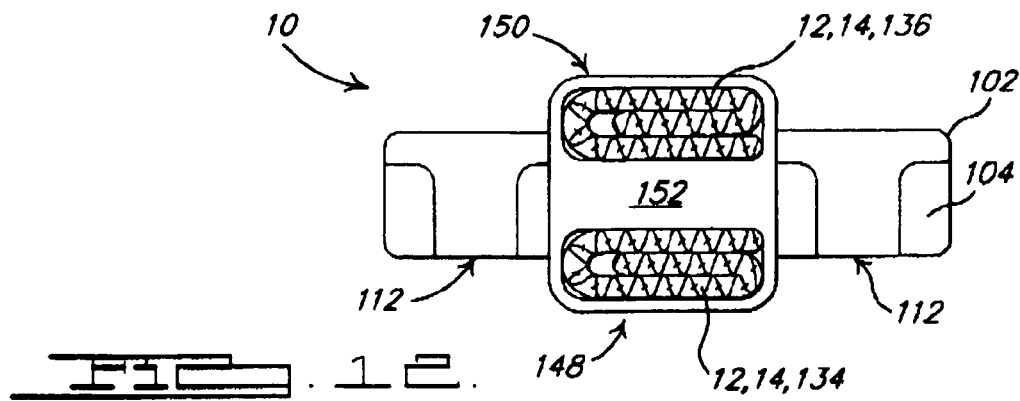
FIG. 12.
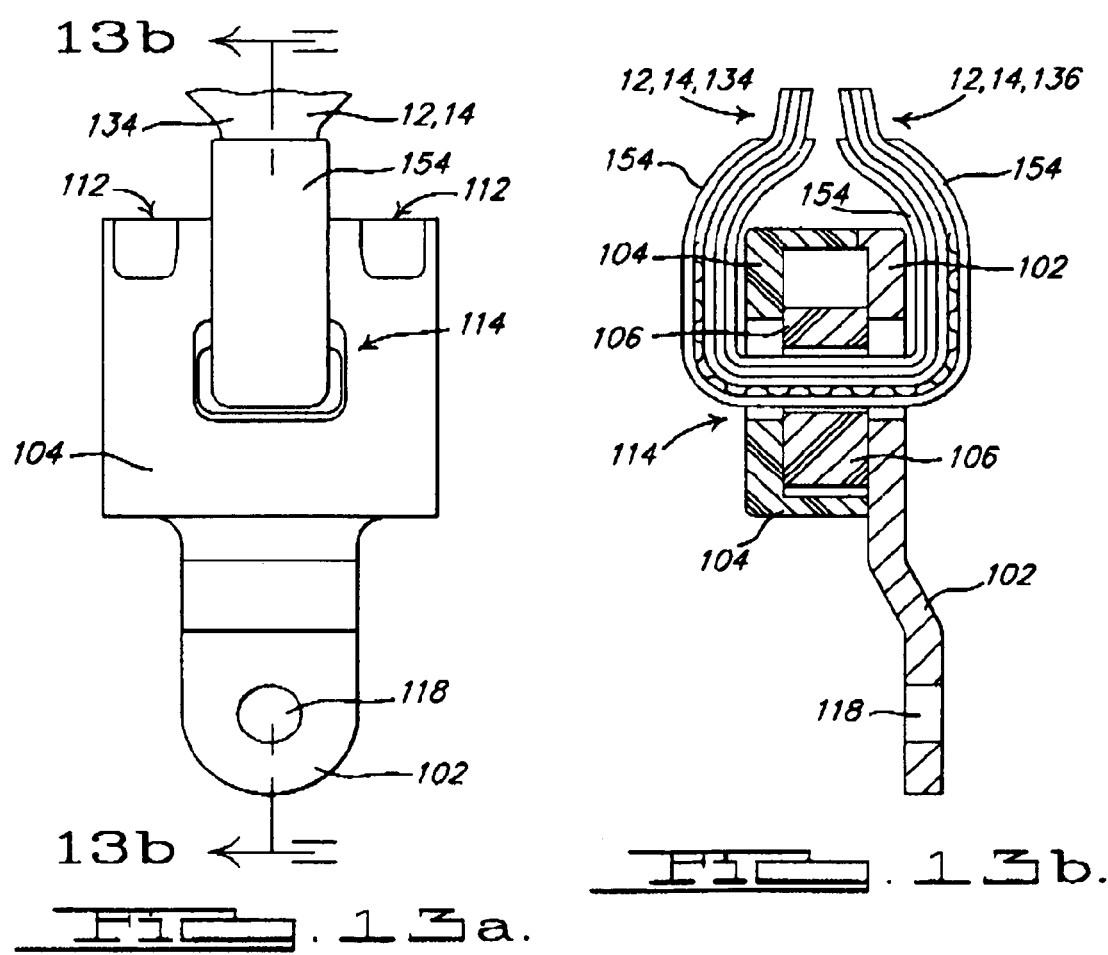
FIG. 13a.
FIG. 13b.

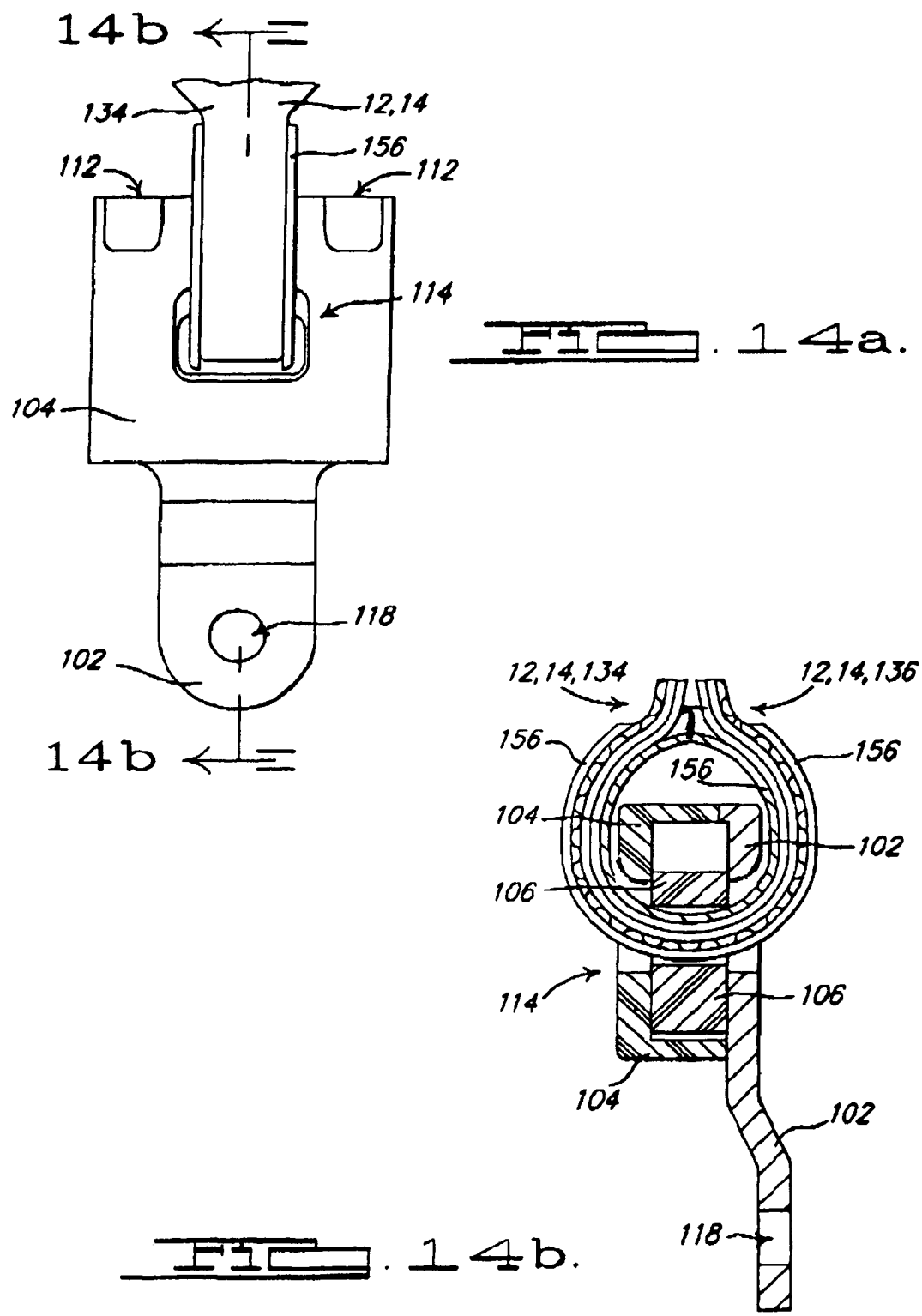

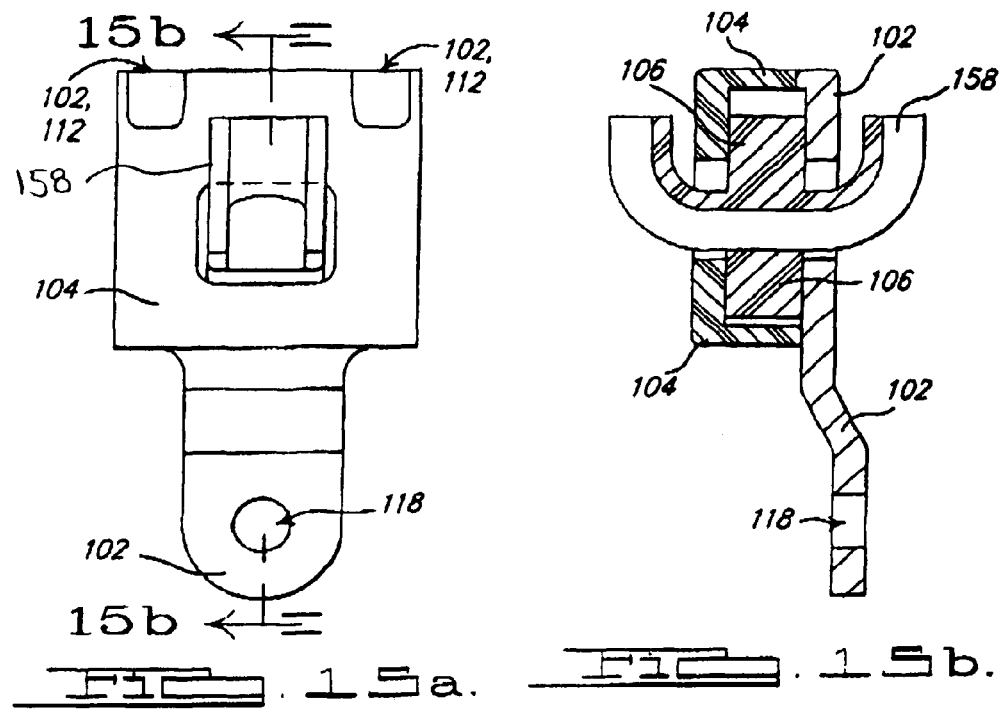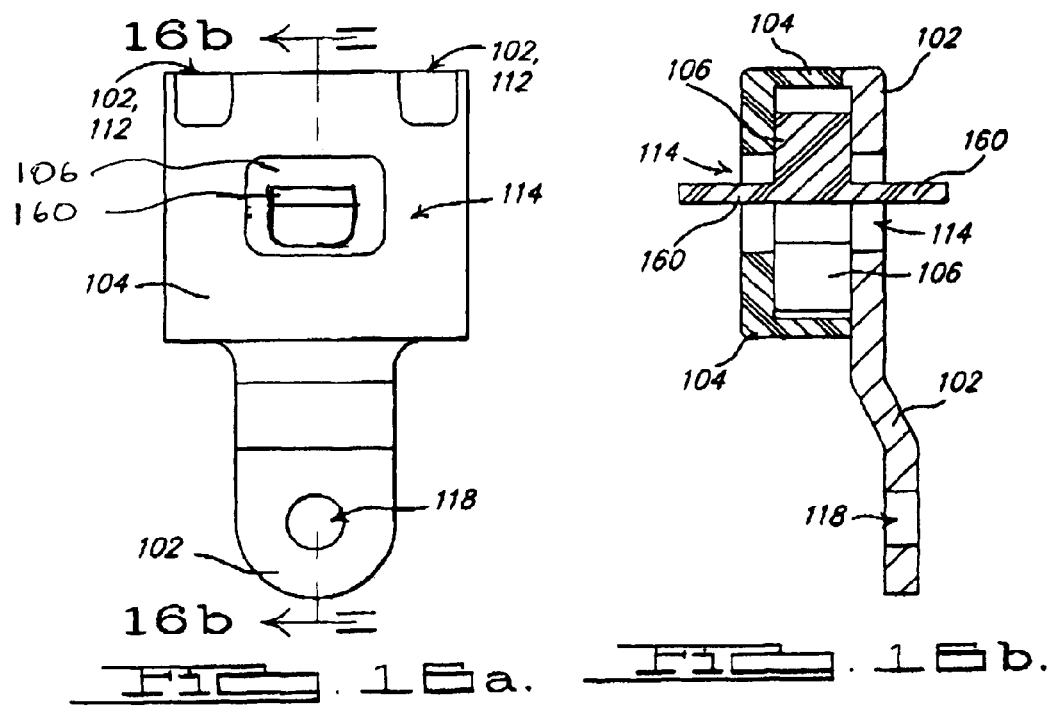

SEAT BELT DEVICE

CROSS-REFERENCE TO RELATED APPLICATIONS

This is a divisional application of U.S. patent application Ser. No. 10/604,319 filed on Jul. 10, 2003, which claims the benefit of U.S. Provisional Patent Application Ser. No. 60/394,815 filed on Jul. 10, 2002.

BRIEF DESCRIPTION OF THE DRAWINGS

In the accompanying drawings:

FIG. 8 illustrates a detail of a portion of a loop of webbing secured by a second set of stitches, for the embodiment of FIG. 6;

FIG. 9 illustrates another method of attaching a seat belt to the seat belt tension sensor, wherein portions of a loop of webbing are folded and stitched separately;

FIG. 10 illustrates yet another method of attaching a seat belt to the seat belt tension sensor, wherein a loop of webbing is bunched or folded within a ring;

FIG. 11 illustrates yet another method of attaching a seat belt to the seat belt tension sensor, wherein portions of a loop of webbing are bunched or folded within separate rings;

FIG. 12 illustrates yet another method of attaching a seat belt to the seat belt tension sensor, wherein portions of a loop of webbing are bunched or folded within separate ring portions that are separated from one another;

FIGS. 13a and 13b illustrate yet another method of attaching a seat belt to the seat belt tension sensor, wherein a loop of webbing is bunched or folded within a sleeve that engages a carriage of the seat belt tension sensor;

FIGS. 14a and 14b illustrate yet another method of attaching a seat belt to the seat belt tension sensor, wherein a loop of webbing is bunched or folded around a thimble that engages a carriage of the seat belt tension sensor;

FIGS. 15a and 15b illustrate yet another method of attaching a seat belt to the seat belt tension sensor, wherein a loop of webbing is bunched or folded around a thimble portion of a carriage of the seat belt tension sensor; and FIGS. 16a and 16b illustrate yet another method of attaching a seat belt to the seat belt tension sensor, wherein the opening of the housing and anchor plate are adapted to reduce or prevent friction from the loop of webbing therewith.

DESCRIPTION OF EMBODIMENT(S)

There exists a need for measuring a tensile load in a flexible load bearing element, such as a webbing, cable, rope or thread. As an example, there exists a need to measure a tensile load in a seat belt used in vehicular safety restraint system, wherein the seat belt load measurement can be used to distinguish a type of object secured by the seat belt, or can be used to compensate for the affect of seat belt loads upon a measurement of seat weight from a seat weight sensor in the seat base.

Figure 1:
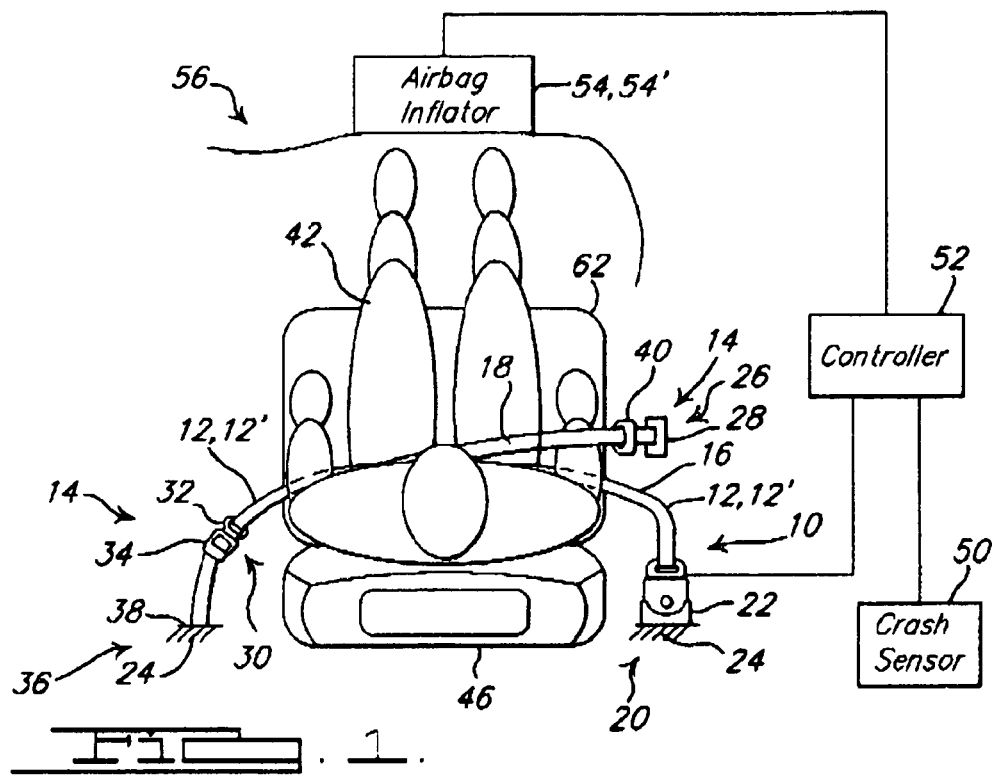
FIG. 1 illustrates a top-view of an occupant wearing a seat belt in a vehicle seat, wherein the seat belt incorporates a seat belt tension sensor.

Referring to FIG. 1, a seat belt tension sensor 10 is operatively coupled to a webbing 12 of a seat belt 14, for measuring a tensile load therein.

The seat belt 14 illustrated in FIG. 1—generally known as a "three-point" seat belt with a continuous loop lap/shoulder belt—comprises a lap belt portion 16 and a shoulder belt portion 18, wherein one end of the lap belt portion 16 the seat belt 14 is attached at a "first point" 20 to a first anchor 22 secured to the vehicle frame 24, one end of the shoulder belt portion 18 is attached at a "second point" 26 to a seat belt retractor 28 secured to the vehicle frame 24, and the other ends of the lap belt portion 16 the shoulder belt portion 18 are located where the seat belt 14 passes through a loop 30 in a latch plate 32 that engages with a buckle 34 that is attached at a "third point" 36 to a second anchor 38 secured to the vehicle frame 24. The shoulder belt portion 18 passes through a "D-ring" 40 operatively connected to the vehicle frame 24 that guides the shoulder belt portion 18 over a shoulder of the occupant 42.

The seat belt retractor 28 has a spool that either provides or retracts webbing 12 as necessary to enable the seat belt 14 to placed around the occupant 42 sufficient to engage the latch plate 32 with the buckle 34, and to remove excess slack from the webbing 12. The seat belt retractor 28 provides a nominal tension in the seat belt 14 so that, responsive to a crash that causes the seat belt retractor 28 to lock the webbing 12 thereby preventing further withdrawal, the occupant 42 is restrained by the seat belt 14 relatively earlier in the crash event than would occur had there been slack in the seat belt 14. During the crash event, when restraining the occupant 42, the webbing 12 of the seat belt 14 can be exposed to a relatively high tensile load, the magnitude of which depends upon the severity of the crash and the mass of the occupant 42.

Figure 2:
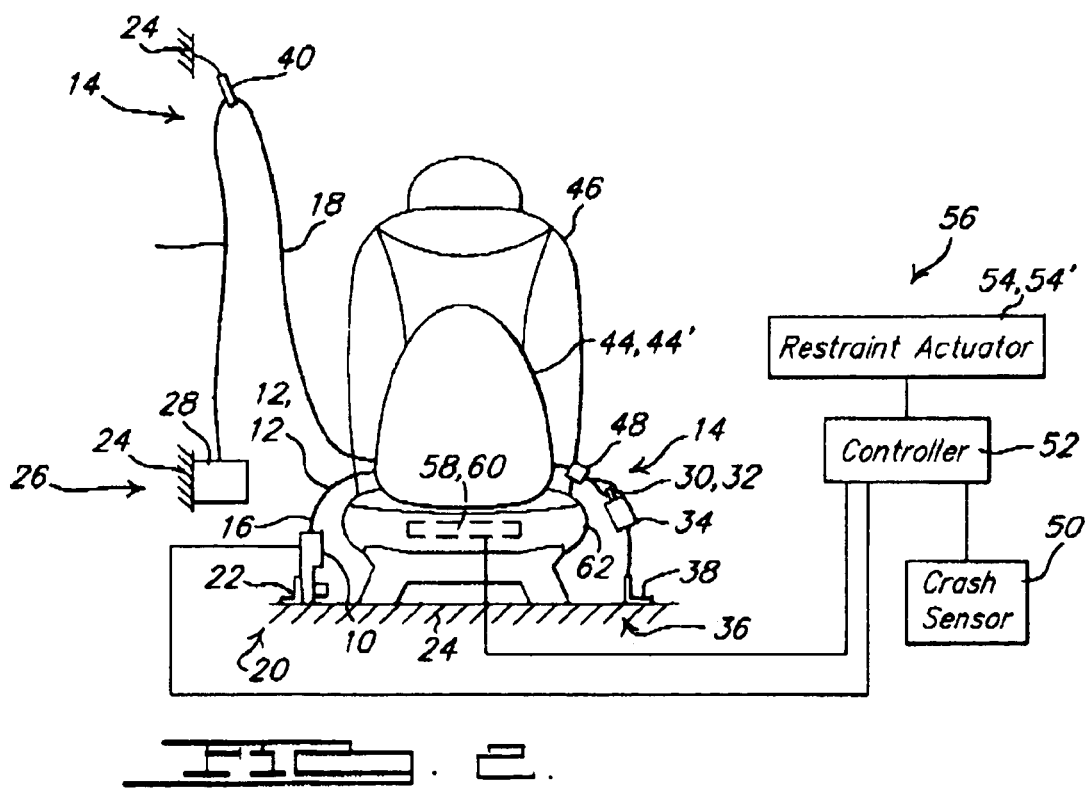
FIG. 2 illustrates a front-view of a vehicle seat upon which a child seat is secured by a seat belt, wherein the seat belt incorporates a seat belt tension sensor and the vehicle seat incorporates a seat weight sensor.

Referring to FIG. 2, the lap belt portion 16 of a seat belt 14 may also be used to secure a child seat 44, such as a rear facing infant seat 44', to the vehicle seat 46, wherein a locking clip 48 may be used to prevent the shoulder belt portion 18 from sliding relative to the lap belt portion 16 proximate to the latch plate 32. In this case, the lap belt portion 16 is typically secured relatively tight—with an associated tensile load greater than the associated comfort limit for an adult—so as to hold the child seat 44 firmly in the vehicle seat 46 by compressing the seat cushion thereof, and the shoulder belt portion 18 is not otherwise relied upon for restraint.

Accordingly, the tensile load in the webbing 12 of the seat belt 14 can be used to discriminate an object on the vehicle seat 46, wherein a tensile load greater than a threshold would be indicative of a child seat 44. Referring to FIGS. 1 and 2, a seat belt tension sensor 10 is operatively coupled to a lap belt portion 16 of a webbing 12 of a seat belt 14 at a particular seating location. The seat belt tension sensor 10 and a crash sensor 50 are operatively coupled to a controller 52 that is adapted to control the actuation of a restraint actuator 54—e.g., an air bag inflator 54'—of a safety restraint system 56 located so as to protect an occupant at the particular seating location. If the tensile load sensed by the seat belt tension sensor 10 is greater than a threshold, then the restraint actuator 54 is disabled by the controller 52 regardless of whether or not a crash is detected by the crash sensor 50. If the tensile load sensed by the seat belt tension sensor 10 is less than a threshold, then the restraint actuator 54 is enabled by the controller 52 so that the restraint actuator 54 can be actuated responsive to a crash detected by the crash sensor 50. Alternately, for a controllable restraint actuator 54, e.g. a multi-stage air bag inflator 54', the timing and number of inflator stages inflated can be controlled to effect a reduced inflation rate rather than disabling the air bag inflator 54' responsive to the seat belt tension sensor 10 sensing a tensile load greater than a threshold.

Referring to FIG. 2, a seat belt tension sensor 10 may be used in conjunction with at least one other occupant sensor 58, e.g. a seat weight sensor 60, to control the actuation of a safety restraint system 56. The seat weight sensor 60 may operate in accordance with any of a variety of known technologies or embodiments, e.g. incorporating a hydrostatic load sensor, a force sensitive resistor, a magnetostrictive sensing elements, or a strain gage load sensor, which, for example, either measure at least a portion of the load within the seat cushion 62, or measure the total weight of the seat. In either case, a tensile load in the seat belt 14 that is reacted by the vehicle frame 24 acts to increase the load upon the seat cushion 62, thereby increasing the apparent load sensed by the seat weight sensor 60. The apparent load is increased by each reaction force, so that a given tensile load in the seat belt 14 could increase the apparent load sensed by the seat weight sensor 60 by as much as twice the magnitude of the tensile load. Accordingly, in a system with both a seat belt tension sensor 10 and a seat weight sensor 60, the seat weight measurement from the seat weight sensor 60 can be compensated for the effect of tensile load in the seat belt 14 so as to provide a more accurate measure of occupant weight, by subtracting, from the seat weight measurement, a component of seat weight caused by, or estimated to have been caused by, the tensile load measured by the seat belt tension sensor 10. If the seat weight measurement from the seat weight sensor 60 is not compensated for the effect of the tensile load in the seat belt 14, a child seat 44 secured to a vehicle seat 46 with a seat belt 14 could cause a load on the seat weight sensor 60 that is sufficiently high to approximate that of a small adult, so that an uncompensated seat weight measurement might cause the associated restraint actuator 54 to be erroneously enabled in a system for which the restraint actuator 54 should be disabled when a child seat 44 is on the vehicle seat 46.

In a system that compensates for the affect of seat belt tension on an occupant sensor 58, the seat belt tension sensor 10, the occupant sensor 58,—e.g. a seat weight sensor 60,—and a crash sensor 50 are operatively coupled to a controller 52 that is adapted to control the actuation of a restraint actuator 54—e.g., an air bag inflator 54'—of a safety restraint system 56 located so as to protect an occupant at the particular seating location. If the tensile load sensed by the seat belt tension sensor 10 is greater than a threshold, then the restraint actuator 54 is disabled by the controller 52 regardless of whether or not a crash is detected by the crash sensor 50 or regardless of the measurement from the occupant sensor 58. If the tensile load sensed by the seat belt tension sensor 10 is less than a threshold, then the restraint actuator 54 is enabled or disabled by the controller 52 responsive to a measurement from the occupant sensor 58, which may be compensated responsive to the tensile load sensed by the seat belt tension sensor 10. If the restraint actuator 54 is enabled, then the restraint actuator 54 can be actuated responsive to a crash detected by the crash sensor 50. Alternately, for a controllable restraint actuator 54, e.g. a multi-stage air bag inflator 54', the timing and number of inflator stages inflated can be controlled to effect a reduced inflation rate rather than disabling the air bag inflator 54' responsive to measurements from the occupant sensor 58 and the seat belt tension sensor 10.

Figure 3:
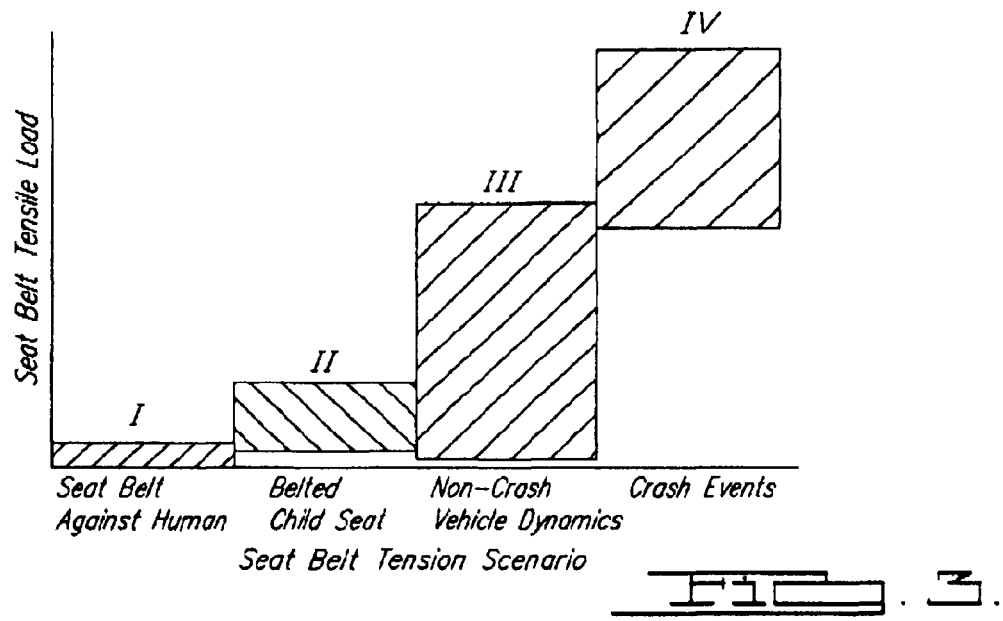
FIG. 3 illustrates scenarios associated with various seat belt tensile load ranges.

Referring to FIG. 3, the loads to which a seat belt 14 is normally exposed can be classified into four ranges as follows: 1) a low range (I) comprising tensile loads associated with the seat belt 14 being placed directly around a human, 2) a low-intermediate range (II) comprising tensile loads associated with the restraint a child seat 44, 3) a high-intermediate range (III) comprising loads associated with non-crash vehicle dynamics, e.g. braking or rough roads, and 4) a high range (IV) comprising tensile loads associated with restraint forces of a crash event. The low range (I), for example, would normally be limited by the maximum tensile load that an occupant 42 could comfortably withstand. The low-intermediate range (II), for example, would normally be limited by the maximum tensile load that a person could apply to the seat belt 14 while securing a child seat 44 to the vehicle seat 46. Notwithstanding that the seat belt 14 and associated load bearing components can be subject to the high range (IV) tensile loads, a seat belt tension sensor 10 would be useful for controlling a safety restraint system 56 if it were capable of measuring low-intermediate range (II) tensile loads associated with securing a child seat 44 to a vehicle seat 46.

Figure 4:
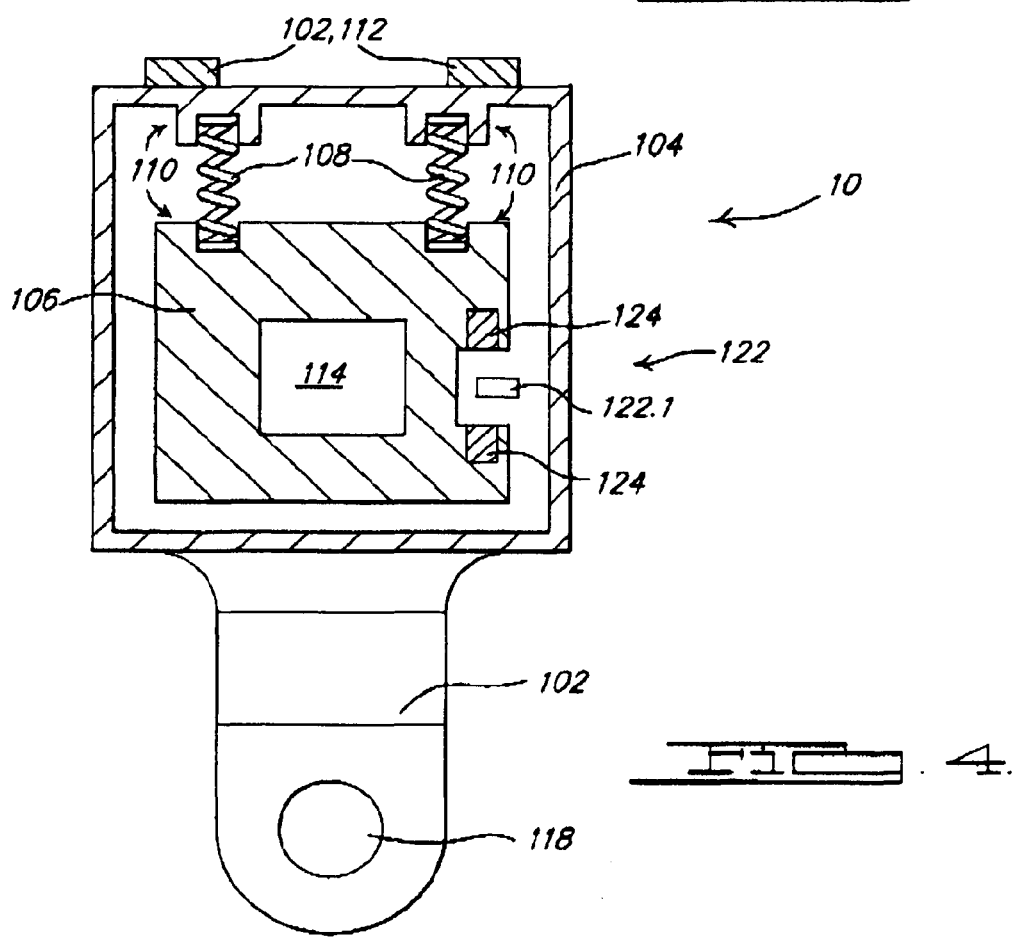
FIG. 4 illustrates a cross-sectional view of seat belt tension sensor.
Figures 5, 6:
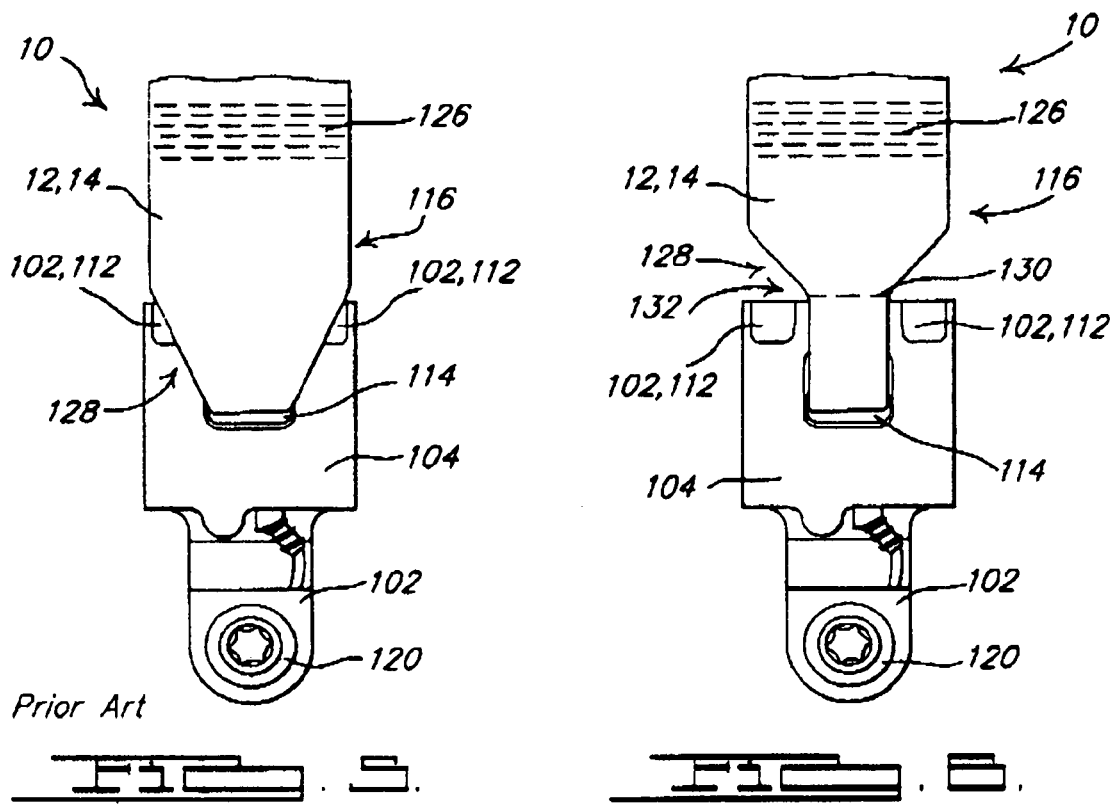
FIG. 5 illustrates a prior art method of attaching a seat belt to a seat belt tension sensor.
FIG. 6 illustrates an embodiment of an improved method of attaching a seat belt to a seat belt tension sensor.

Referring to FIGS. 4–6, an exemplary seat belt tension sensor 10 comprises an assembly of an anchor plate 102, a housing 104, a carriage 106 moveable within the housing 104, and a pair of helical compression springs 108 disposed between the carriage 106 and the housing 104 within associated spring guide cavities 110. The housing 104 engages and is restrained by a pair of fingers 112 extending from the anchor plate 102, and is also attached to the anchor plate 102 with a screw. Openings 114 in the carriage 106, housing 104 and anchor plate 102 are aligned so as form an opening 114 in the assembly to which is attached a loop 116 of webbing 12 of a seat belt 14. The anchor plate 102 further comprises a mounting hole 118 by which the seat belt tension sensor 10 is attached with an anchor bolt 120 to a vehicle frame 24. A proximity or displacement sensor 122 measures the position of the carriage 106 relative to the anchor plate 102. For example, a Hall-effect sensor 122.1 or the like, operatively coupled to the housing 104, cooperates with a pair magnets 124 that are mounted in the carriage 106 so as to provide an output signal that is responsive to the position of the carriage 106 with respect to the anchor plate 102.

Figure 7:
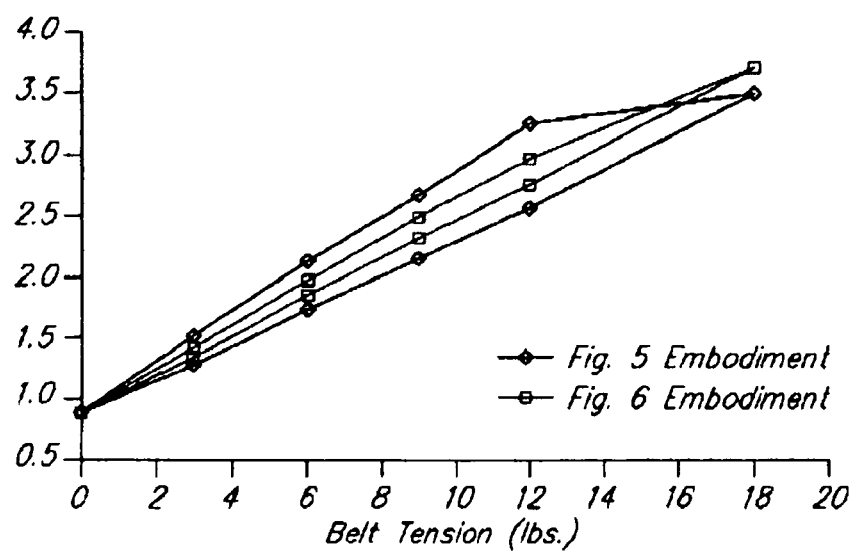
FIG. 7 illustrates a plot of seat belt tension sensor output as a function of seat belt tension comparing the prior art and improved attachments of a webbing of a seat belt to a seat belt tension sensor.

In operation, a tension in the webbing 12 of the seat belt 14 is applied to the carriage 106 and is reacted by the carriage 106 through the helical compression springs 108, the housing 104, the anchor plate 102 and the anchor bolt 120. The displacement of the carriage 106 is responsive to the tension, and is sensed by the Hall-effect sensor 122.1, the output of which is responsive to the strength of the magnetic field thereat—generated by the magnets 124 that move with the carriage 106—which provides a measure of displacement of the carriage 106 relative to the housing 104 and anchor plate 102, which in turn provides a measure of seat belt tension based upon the effective compliance of the helical compression springs 108. Accordingly, a tension in the seat belt 14 causes a motion of the carriage 106, and this motion is calibrated by the effective force-displacement characteristic of the helical compression springs 108, which provides for generating a measure of seat belt tension from a measure of displacement of the carnage 106 relative to the housing 104 and anchor plate 102. The webbing 12 of a seat belt 14 moves with the carriage 106 relative to the housing 104 responsive to a tension in the seat belt 14. More particularly, the webbing 12 slides over the surface of the seat belt tension sensor 10 (e.g. housing 104 and anchor plate 102) responsive to this motion, thereby generating associated frictional forces in a direction that is opposite to the direction of motion. These frictional forces cause an associated hysteresis in the output signal from the Hall-effect sensor 122.1, i.e. a dependence of the output upon whether the seat belt tension is increasing or decreasing, as illustrated in FIG. 7.

Stated in another way, the seat belt tension sensor 10 comprises an assembly of a first portion of the seat belt tension sensor 10, and a carriage 106 moveable relative thereto, wherein openings 114 in the first portion—i.e. openings 114 in the anchor plate 102 and housing 104—cooperate with the opening 114 in the carriage 106. A seat belt 14 looped through the opening 114 in the first portion of the seat belt tension sensor 10, if not otherwise constrained, is susceptible of generating non-negligible frictional forces and associated hysteresis as a result of rubbing against either a side or an outer surface of, the opening 114 in the first portion of the seat belt tension sensor 10, responsive to a tension load applied to the seat belt 14.

Referring to FIG. 5, in accordance with a prior art method of attaching a seat belt 14 to a seat belt tension sensor 10, the webbing 12 is looped through the opening 114 in the carriage 106, housing 104 and anchor plate 102 of the seat belt tension sensor 10, and the two resulting portions of the webbing 12 (on either side of the opening 114) are laid against one another and sewn together at a first set of stitches 126 across the width of the webbing 12, so as to form a closed loop 116 of webbing 12 through the opening 114 and around the seat belt tension sensor 10. The first set of stitches 126 are adapted to be sufficiently strong to safely withstand the full range of tension loads to which the webbing 12 is exposed during the operation of the seat belt 14. For the width of the opening 114 substantially narrower than the nominal width of the webbing 12, the webbing 12 of the loop 116 is bunched or folded together within the opening 114, and fans out 128 from the opening 114 to the first set of stitches 126, on both sides of the seat belt tension sensor 10. For example, the width of the opening 114 may be about half the nominal width of the webbing 12, or less. The bunching of the webbing 12 within the opening 114 generates lateral forces against the sides of the opening 114 in the housing 104 and/or anchor plate 102 when a tension is applied to the webbing 12, which cause associated frictional forces that oppose motion of the webbing 12 relative to the housing 104, which reduce the apparent tension sensed by the seat belt tension sensor 10 as the tension is in the webbing 12 is increased, and which increase the apparent tension sensed by the seat belt tension sensor 10 as the tension is in the webbing 12 is decreased, thereby causing substantial measurement hysteresis as is illustrated in FIG. 7 in the plot of the output of the Hall-effect sensor 122.1 of the seat belt tension sensor 10 as a function of the associated seat belt tension for the seat belt attachment illustrated in FIG. 5.

Referring to FIG. 6, illustrating an improved method of attaching a seat belt 14 to the seat belt tension sensor 10, the webbing 12 of the loop 116 is bunched or folded together within the opening 114, and is further bunched or folded above the opening 114, e.g. where the webbing 12 follows the outside surfaces of the seat belt tension sensor 10, so as to prevent the webbing 12 from rubbing against the sides of the housing 104 and/or anchor plate 102. For example, in the embodiment illustrated in FIG. 6, a second set of stitches 130 are provided in the loop 116, between the first set of stitches 126 and the restraining end 132 of the housing 104 within the loop 116, so as to prevent the bunched or folded webbing 12 from fanning out from the opening 114. Instead, the second set of stitches 130 substantially prevent the width of the bunched or folded webbing 12 within the opening 114 from expanding with increasing seat belt tension, thereby reducing associated frictional forces against the sides of the opening 114 in the anchor plate 102 or housing 104 that cause associated measurement hysteresis. Referring to FIG. 7, the measurement hysteresis for the embodiment of FIG. 6 is substantially less than that for the embodiment of FIG. 5.

There are various means that may be used to constrain the width of the webbing 12 along the seat belt tension sensor 10. In the embodiment of FIG. 6, both portions 134, 136 of the webbing 12 of the loop 116 are folded and stitched together with a second set of stitches 130, as further illustrated in FIG. 8.

Referring to FIG. 9, in another embodiment of an improved method of attaching a seat belt 14 to the seat belt tension sensor 10, the individual portions 134, 136 of the webbing 12 of the loop 116 is separately folded and sewn with respective third 138 and fourth 140 sets of stitches.

Referring to FIG. 10, in yet another embodiment of an improved method of attaching a seat belt 14 to the seat belt tension sensor 10, both portions 134, 136 of the webbing 12 of the loop 116 are bunched or folded within a ring 142, e.g. a metal ring, located between the seat belt tension sensor 10 and the first set of stitches 126, wherein the ring 142 may be either closed as illustrated in FIG. 10, or open—e.g. along a portion of one side thereof—but with sufficient rigidity and shaped so as to maintain the bunched or folded condition of the webbing 12 within the ring 142.

Referring to FIG. 11, in yet another embodiment of an improved method of attaching a seat belt 14 to the seat belt tension sensor 10, each portion 134, 136 of the webbing 12 of the loop 116 is bunched or folded within a respective ring 144, 146 e.g. respective metal rings, located between the seat belt tension sensor 10 and the first set of stitches 126, wherein one or both rings 144, 146 may be either closed as illustrated in FIG. 11, or open—e.g. along a portion of one side thereof—but with sufficient rigidity and shaped so as to maintain the bunched or folded condition of the webbing 12 within the respective rings 144, 146.

Referring to FIG. 12, in yet another embodiment of an improved method of attaching a seat belt 14 to the seat belt tension sensor 10, each portion 134, 136 of the webbing 12 of the loop 116 is bunched or folded within a respective ring portion 148, 150, located between the seat belt tension sensor 10 and the first set of stitches 126, wherein the ring portions 148, 150 are separated by a spacer 152 that keeps the loop 116 sufficiently open so as to reduce rubbing and associated frictional forces between the loop 116 and the surfaces of the housing 104 and/or anchor plate 102, wherein one or both ring portions 148, 150 may be either closed as illustrated in FIG. 12, or open—e.g. along a portion of one side thereof—but with sufficient rigidity and shaped so as to maintain the bunched or folded condition of the webbing 12 within the respective ring portions 148, 150.

Referring to FIGS. 13*a* and 13*b*, in yet another embodiment of an improved method of attaching a seat belt 14 to the seat belt tension sensor 10, the loop 116 of webbing 12 is fed through a sleeve 154, e.g. of plastic, that engages the carriage 106 of the seat belt tension sensor 10 and keeps the webbing 12 bunched or folded therein so as to prevent the loop 116 from rubbing against the sides of the opening(s) 114 in the housing 104 and/or anchor plate 102. An at least semi-rigid sleeve 154 could be shaped so as to keep the loop 116 open, so as to reduce or prevent friction caused by the loop 116 rubbing against the face(s) of the housing 104 and/or anchor plate 102. Referring to FIGS. 14a and 14b, alternately a thimble 156 could be used instead of a sleeve 154. Referring to FIGS. 15a and 15b, alternately a thimble portion 158 could be incorporated in the carriage 106 to engage a bunched or folded webbing 12 of the loop 116 and to thereby reduce or prevent friction caused by the loop 116 rubbing against the face(s) of the housing 104 and/or anchor plate 102.

Referring to FIGS. 16a and 16b, in yet another embodiment of an improved method of attaching a seat belt 14 to the seat belt tension sensor 10, the openings 114 in the housing 104 and anchor plate 102 are adapted to be sufficiently wider than that of the opening 114 in the carriage 106 so as to keep the bunched or folded webbing 12 of the loop 116 within the opening 114 of the carriage 106 from rubbing against the sides of the openings 114 in the housing 104 and anchor plate 102 when the seat belt 14 is tensioned. This may be combined with either a flange 160—or, as illustrated in FIG. 15, a thimble portion 158—on the carriage 106 so as to reduce or prevent friction caused by the loop 116 rubbing against the face(s) of the housing 104 and/or anchor plate 102.

While specific embodiments have been described in detail in the foregoing detailed description and illustrated in the accompanying drawings, those with ordinary skill in the art will appreciate that various modifications and alternatives to those details could be developed in light of the overall teachings of the disclosure. For example, rather than bunching or folding a portion of the webbing, the webbing may be woven so as to locally narrow that portion, wherein the warp fibers are bunched together in the narrowed portion of the webbing and the associated weft fibers are interlaced therewith accordingly. Furthermore, the friction and associated hysteresis between webbing and the seat belt tension sensor may be reduced by interposing a relatively low friction coating or material at a location of sliding contact between the webbing and the seat belt tension sensor. Accordingly, the particular arrangements disclosed are meant to be illustrative only and not limiting as to the scope of the invention, which is to be given the full breadth of the appended claims and any and all equivalents thereof.

We claim:

1. A seat belt device comprising:
   a webbing; and
   a belt tension sensor;
   wherein one end of the webbing includes a loop that is connected to the sensor;
   wherein the loop portion includes a folded portion that passes through an opening in the sensor;
   wherein the webbing includes a stitching located between the folded portion and a tapered portion of the webbing to maintain the shape of the folded portion, and
   wherein the webbing includes a second stitching located outside of the tapered portion.

2. The device of claim 1, wherein the width of the folded portion located in the webbing is less than the width of the opening.

3. The device of claim 1, wherein the stitching runs transverse to the longitudinal direction of the webbing.

4. The device of claim 1, wherein the folded portion includes a plurality of folds.

5. A seat belt device having a webbing passing through an opening in a webbing tension sensor, wherein the webbing located in the opening is folded and constrained from unfolding by a first stitching extending in a direction transverse to the longitudinal direction of the webbing, the first stitching being located between the fold in the webbing and a tapered portion of the webbing, and wherein the webbing includes a second stitching located outside of the tapered portion.

6. A seat belt including one end connected to the belt by a first stitching to thereby form a looped portion; wherein no portion of the seat belt adjacent to the looped portion is folded and wherein the looped portion includes a folded portion and a transition portion that fans out from the folded portion to join the unfolded portion of the seat belt; wherein the first stitching is located in the unfolded portion of the belt substantially adjacent to the folded portion and wherein a second stitching is located in the folded portion to constrain the belt from unfolding.

7. The device of claim 6, wherein the first stitching includes several rows of stitching.

8. The device of claim 6, wherein the second stitching includes a single row of stitching.

9. The device of claim 6, wherein the second stitching is located between the folded portion and the transition portion.

10. A device including a belt tension sensor and a seat belt; the seat belt including one end connected to the belt by a first stitching to thereby form a looped portion; wherein the portion of the seat belt adjacent to the looped portion is not folded and wherein the looped portion includes a folded portion and a transition portion that fans out from the folded portion to join the unfolded portion of the seat belt; wherein the first stitching is located in the unfolded portion of the belt substantially adjacent to the folded portion and wherein a second stitching is located in the folded portion to constrain the belt from unfolding, and wherein the belt tension sensor is connected to the looped portion of the seat belt.

11. The device of claim 10, wherein the sensor includes an opening having a width greater than the width of the folded portion of the belt to thereby reduce the contact between the belt and sides of the opening in the sensor to improve the accuracy of tensile force being sensed by the sensor.

12. The device of claim 10, wherein the sensor includes a carriage having an opening adapted to engage the folded portion of the belt and being configured to move upon application of a tension to the belt.

13. The device of claim 12, wherein the sensor further comprises a spring positioned so that a spring force opposes the movement of the carriage in response to the belt tension.

* * * * *